July 15, 1958
A. V. ADAMS
2,843,423
WAGON HOIST APPARATUS
Filed April 28, 1955
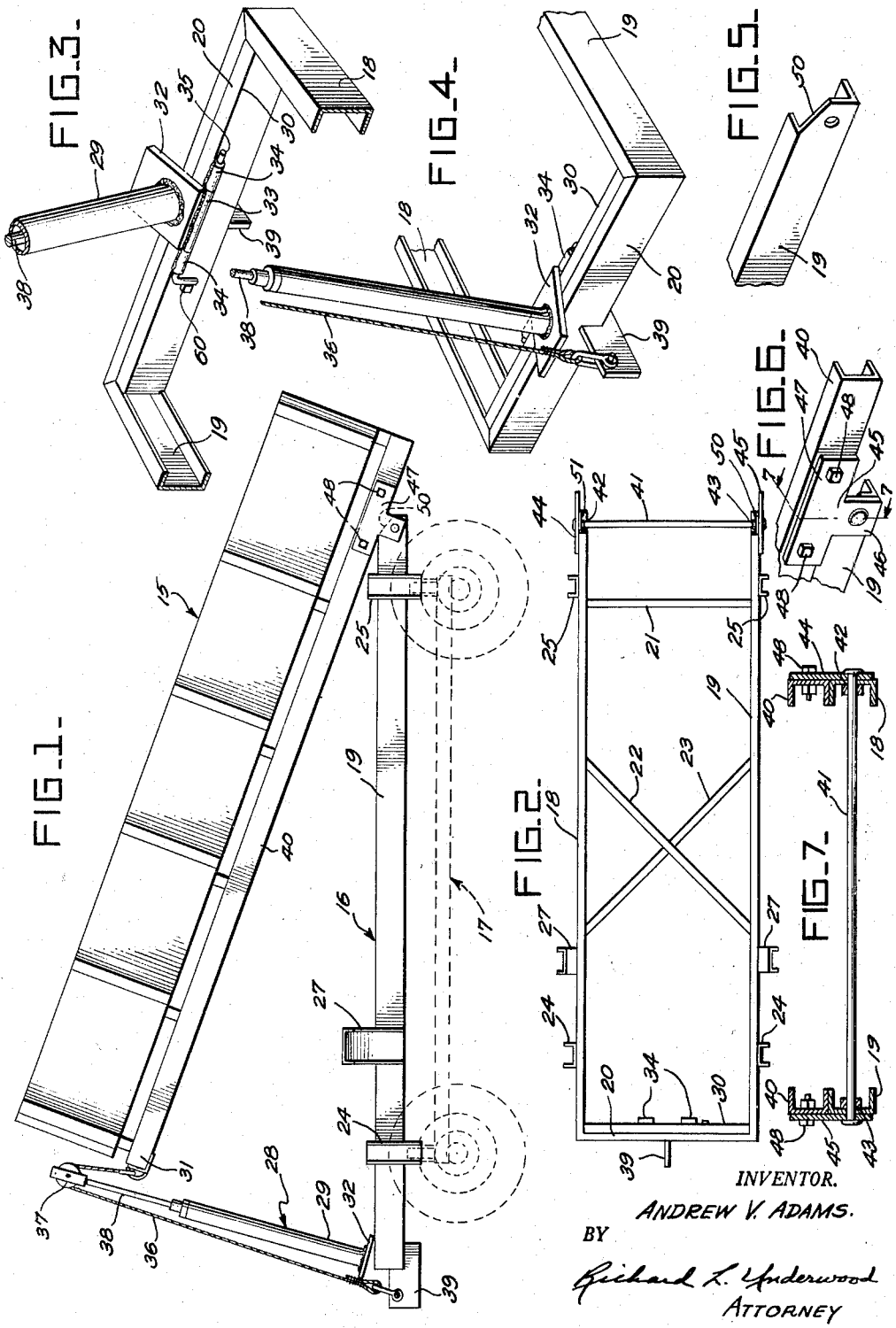
INVENTOR.
ANDREW V. ADAMS.
BY
Richard L. Underwood
ATTORNEY

United States Patent Office 2,843,423
Patented July 15, 1958

2,843,423

WAGON HOIST APPARATUS

Andrew V. Adams, Osage, Iowa

Application April 28, 1955, Serial No. 504,465

4 Claims. (Cl. 298—22)

My invention relates to a dumping vehicle having a wagon box which is pivotally mounted at the rearward end of the vehicle and is attached at a single longitudinally central point at its forward end to an elevating device.

While a number of patents have been granted on farm wagons which can be dumped by means of hydraulic power mechanisms, the structures involved are somewhat complicated and involve the utilization of various controls for preventing dangerous swaying of the wagon box and damaging strains and stresses due to unequalized lifting forces.

By my invention a frame is provided which through suitable means may be mounted on a vehicle chassis of well known design, this frame having a minimum of structural elements consistent with required rigidity. A lifting power means is pivotally mounted on the rearward edge of a front transverse member of the frame, guide means being provided in the lifting power means for guiding a cable-like means which is longitudinally aligned with a vertical plane through the longitudinal center line of the frame. The forward end of the cable-like means is attached to the frame and the rearward end is attached to the wagon box. The frame has bearings in the rear end portions of the side members in which is journaled a shaft; T-shaped members are welded to the ends of the shaft outside of the side members and are bolted to the wagon box, thereby providing an exceptionally rugged yet simple hinging mechanism. The rear ends of the side members of the frame are cut away to provide downwardly and rearwardly slanted upper surfaces which provide stops for the wagon box when elevated to a predetermined dumping position.

Other important objects and advantageous features of my invention will be apparent from the following description and accompanying drawings wherein for purposes of illustration herein a specific embodiment of my invention is set forth in detail and wherein:

Fig. 1 is a side elevation of my invention showing the vehicle chassis in phantom;

Fig. 2 is a top view of the frame;

Fig. 3 is a perspective view of a fragment of the frame and lifting power means;

Fig. 4 is a perspective view of the structure of Fig. 3 as viewed in the opposite direction;

Fig. 5 is a perspective view of the rear portion of a side member of the frame;

Fig. 6 is a perspective view of the T-shaped member which pivotally mounts the wagon box on the frame; and Fig. 7 is a view taken along line 7—7 of Fig. 6 and showing the hinge and shaft mounted in the frame and on the understructure 40 of the wagon box.

Referring now to Fig. 1, it will be seen that my invention comprises a wagon box 15 which is hinged at its rear portion to a frame 16, the frame in turn being rigidly affixed to a vehicle chassis 17 shown in phantom. The frame 16 includes two longitudinal side members 18 and 19 which are channel steel bars of U configuration, a front transverse member 20 of heavy construction connected between and rigidly to the front ends of the side members 18 and 19 and a rear member 21 connected transversely between and rigidly to the rearward portions of the side members 18 and 19. The front transverse member 20, as seen in Figs. 2 and 3, is made up of two U channel members welded to form an enclosed space rectangular in cross section. Cross bars 22 and 23 (Fig. 2) are positioned in the middle of the frame to add rigidity.

Attaching pairs of channel segments 24 and 25 are rigidly connected to the outer vertical face of the side members 18 and 19, two on each side, for rigid connection to a suitable portion of the vehicle chassis 17. These channel segments extend slightly above the top surface of the side members 18 and 19 to aid in maintaining the proper seated position of the wagon box on the frame.

Guiding and alignment channel elements 27 are rigidly affixed to the outer faces of the side members 18 and 19 about one-third the distance rearwardly from the front edge of the frame 16, these guiding elements 27 being directed upwardly and outwardly from the side members, as best seen in Figs. 1 and 2, to guide the wagon box into proper aligned position with the frame during the final stages of the lowering operation.

The lifting power means 28 comprises a hydraulic cylinder 29 pivotally mounted on the rear edge 30 of the front member 20, this rear edge 30 being positioned forwardly of the forward edge 31 of the wagon box 15. The hydraulic cylinder 29 has a base plate 32 with pipe-like bearing 33 attached thereto. This pipe-like bearing 33 fits between outer pipe-like bearing segments 34, 34 rigidly affixed to the rearward edge 30 of the front member 20. A pin 35 is disposed within the outer bearing segments 34, 34 and the inner bearing 33 to provide a hinge for the lifting power means 28 having an axis which is normal to or transversely of the longitudinal center line of the frame.

A cable-like means 36, such as a steel cable, is positioned in the guide means 37 or pulley at the upper end of the hydraulic piston rod 38, and the forward end of the cable 36 is connected to a bar 39 attached to and extending forwardly of the front member 20 of the frame 16. The rear end of the cable 36 is attached to the forward edge 31 of the wagon box 15. Suitable hook means and eyes are provided for attaching the cable's front and rear ends, these attaching means being positioned such that the cable is entirely disposed within the vertical plane of the longitudinal center line of the frame 16. The wagon box may have the same transverse dimension as the frame or, as is the usual case, the wagon box is preferably wider than the frame.

Referring now to Figs. 5, 6 and 7, it will be seen that the hinge means for the wagon box comprises a shaft 41 which is journaled in holes or bearings 42 and 43 in the rearward portions of the side members 18 and 19. Rigidly affixed to the ends of the shaft 41 are T-shaped plates 44 and 45, the vertical portion 46 of the T-plate being attached to the shaft 41 and the horizontal portion 47 of the T-plate having holes for the receipt of bolts 48 which attach the T-shaped plates 44 and 45 to the wagon box 15.

The ends of the side members 18 and 19 are cut away to provide two rearwardly and downwardly slanted upper surfaces 50 and 51 against which the bottom of the wagon box 15 abuts upon reaching its predetermined highest elevated position.

The hydraulic hoist system employed allows the wagon box 15 to be raised twice the distance of the extension of the piston rod 38. Since the hydraulic cylinder 29 is pivotally mounted forwardly of the front edge 31 of the wagon box, no contact between the wagon box and the hydraulic cylinder is encountered, and therefore, no controlling device or stop elements are required. The wagon box is lifted smoothly and evenly, the uneven strains being reduced to a minimum by the unhampered compensating pivoting of the hydraulic cylinder.

Farmers and truckers usually have a number of wagon box equipped chassis. The present invention enables the user of a number of wagon boxes to employ a single hydraulic unit for dumping each of the wagon boxes. The frame is designed to be easily mounted on chassis of varying structures, and wagon boxes of varying designs can be easily mounted on the T-plates by suitable use of extensions and the like. The relatively expensive hydraulic unit may be used to dump a series of wagons by merely lifting the hydraulic cylinder up onto the front member 20. By sliding the cylinder, the bearing 33 can be slid between the outer bearing segments 34, 34 and the pin 35 can be slid in place. After being moved to complete coupling position, the pin 35 can be rotated downwardly into restrained position in engagement with a pin lock 60 of suitable design. It will be readily appreciated, therefore, that the relatively expensive unit, namely, the lifting power means, can be easily and simply carried from one vehicle to another to accomplish the dumping of a wagon box mounted on the frame of my invention. A suitable hydraulic pump system, such as found on farm tractors and the like, can, of course, be utilized for operating the hydraulic power means 28.

In view of the foregoing, various modifications of my invention described herein will be apparent to those skilled in the art without departing from the spirit and scope thereof.

I claim:

1. A wagon box supporting and dumping device for mounting a wagon box on a vehicle chassis comprising a frame adapted for rigid attachment to said vehicle chassis and including two longitudinal U-channel side members, a rear U-channel member connected transversely between and rigidly to said side members, and a front member of heavy construction connected transversely between and rigidly to the front ends of said side members, a lifting power means including a base plate pivotally mounted on the rear upper edge of said front member for pivotal movement about a transverse axis, said lifting power means having a guide, cable-like means slidably positioned in said guide and entirely disposed within the vertical plane of the longitudinal center line of said frame and having its front end secured to said front member forwardly of said base plate and having its rear end adapted for mounting on the wagon box, said side members having downwardly and rearwardly slanted upper surfaces at the rear ends thereof for abutment by said wagon box when in elevated condition.

2. A wagon box supporting and dumping device for mounting a wagon box on a vehicle chassis comprising a frame adapted for rigid attachment to said vehicle chassis and including two longitudinal U-channel side members, a rear U-channel member connected transversely between and rigidly to said side members, and a front member of two opposed and connected U-channels connected transversely between and rigidly to the front ends of said side members, a lifting power means including a base plate pivotally mounted on the rear upper edge of said front member for pivotal movement about a transverse axis, said lifting power means having a hydraulic cylinder and piston unit mounted on said base plate and a pulley at the upper end of said piston, a cable slidably positioned in said pulley and entirely disposed within the vertical plane of the longitudinal center line of said frame and having its front end secured to said front member forwardly of said base plate and having its rear end adapted for mounting on the wagon box, said side members having downwardly and rearwardly slanted upper surfaces at the rear ends thereof for abutment by said wagon box when in elevated condition.

3. A wagon box supporting and dumping device in accordance with claim 1 and including a shaft journaled in the rear end portions of said side members, and T-shaped plates rigidly affixed to the ends of said shaft, said T-shaped plates having horizontal top portions with holes for receiving bolts for rigidly mounting the wagon box thereon.

4. A wagon box supporting and dumping device in accordance with claim 2 and including a shaft journaled in the rear end portions of said side members, and T-shaped plates rigidly affixed to the ends of said shaft, said T-shaped plates having horizontal top portions with holes for receiving bolts for rigidly mounting the wagon box thereon.

References Cited in the file of this patent

UNITED STATES PATENTS

| | | |
|---|---|---|
| 1,365,810 | Avery | Jan. 18, 1921 |
| 1,728,460 | Weber et al. | Sept. 17, 1929 |
| 2,596,948 | Ulrich | May 13, 1952 |